Patented June 10, 1947

2,422,049

UNITED STATES PATENT OFFICE 2,422,049

VULCANIZED FATTY OIL EMULSIONS

Paul Stamberger, Dover, Del.

No Drawing. Application November 14, 1942,
Serial No. 465,637

18 Claims. (Cl. 106—249)

This invention relates to the manufacture of new and improved products of vulcanized esters of unsaturated fatty acids with polyhydric alcohols.

According to the invention the improved products are initially prepared in the form of aqueous dispersions or emulsions. These emulsions as such have advantageous characteristics, but it should also be understood that products obtained from such dispersions or emulsions (for instance, coating films or other ultimate products) also have improved properties.

The esters may be fatty oils, both of vegetable and also of animal origin, and especially certain semi-drying and drying fatty oils, identified more fully hereinafter.

It has been known to produce solid, elastic masses, known as rubber substitutes or factices, from unsaturated fatty oils, by heating the oils with sulphur. In the manufacture of such vulcanized oil products, it has been suggested to interrupt the vulcanization, by terminating the heating at a point prior to solidification at vulcanizing temperatures. This practice is referred to in U. S. Patent 2,083,549, issued June 15, 1937, of which the present applicant is one of the patentees, and in said patent reference is further made to the making of water dispersions with such vulcanized products.

According to the prior patent above mentioned, the reaction between a fatty oil and sulphur takes place in two stages in which, in general, in the first stage the formation of a liquid, semi-solid or pasty sulphur compound of the fatty oil is produced, this compound being soluble in numerous solvents, such as acetone, benzene and octene. According to said prior patent, the second step of the reaction between a fatty oil and sulphur is, in general, accompanied by the formation of solid, elastic products, such formation of solid elastic products taking place on further heating of the liquid, semi-solid or pasty compounds. The final products are insoluble in solvents, although they may show swelling. (Compare the publication of Stamberger in Receauil des Traveaux Chimiques des Pays Bas, vol. 46, pages 836–840, and in U. S. Patent 2,083,549, page 1, second column, lines 6–30.)

Intermediate stages before the formation of solid masses can be isolated. The second stage of the reaction apparently is not a vulcanization, since no additional sulphur seems to combine with the oil on further heating, although a polymerization and solidification apparently takes place, more or less gradually.

I have found that when in this known process products are isolated at a certain controlled or more advanced stage of the reaction than the products used in U. S. Patent 2,083,549 to form emulsions, new products can be produced having new and valuable properties.

I have further found that if the reaction of the fatty acid ester with sulphur be terminated at a certain advanced stage (identified more fully hereinafter), products can be secured which, although liquid or semi-liquid below 100° C. at the time of termination of the reaction, nevertheless, are capable of "spontaneously" changing into elastic solids or solid plastic masses at an accelerated rate after dispersion in water without any further heating. Since previously known fatty oil sulphur compounds can be stored for extended periods without any change, the behavior just mentioned is quite unexpected.

The solidification which I have found to take place without heating will occur gradually, for instance, upwards of a few days after making a dispersion in water.

Such "spontaneous" solidification in the dispersion will take place provided the stage of the reaction is sufficiently advanced. In general, the time necessary for solidification in the dispersion will depend upon the stage to which the reaction is carried before termination thereof.

The solidification (without heating) can and is preferably accelerated by addition to the dispersion of one or more definite chemical compounds which I have found to accelerate such solidification. The transformation from a liquid, semi-liquid or plastic but fusible material to a solid product may take place quite rapidly with a relatively highly concentrated solution of an accelerator, and this behavior may be employed as a test for the determination of the state of progress of the reaction during manufacture of the product, thereby enabling determination of the point in the reaction at which the heating should be terminated. This matter is discussed more fully below.

A test which I prefer to employ consists in bringing one drop of the reaction product in contact with the concentrated solution of the accelerator in a test tube and determining the time for solidification by pressing the drop against the test tube with a glass rod. The preferred time for solidification in the test may vary from a fraction of a minute to thirty minutes according to the progress of the reaction and the nature of the accelerator used. It is preferable to employ a 25% aqueous ammonia solution as the reagent in the test, in which case solidification will be observed within about five minutes.

The properties of the product which can be obtained from the water dispersion depend mainly on how advanced is the reaction in the intermediate stage before emulsification. This degree of the reaction as already pointed out can be determined by the solidification test in a concentrated solution of the accelerator for solidification. Such accelerators are for example: a 25–30% solution of ammonia in water, a 50% aqueous solution of triethanolamine, ethylendiamine, sodiumdithiocarbamate or morpholine, and in general, aliphatic or aromatic water soluble bases. It is to be understood that the specific accelerators just mentioned are given only by way of example, and further that the concentration of the accelerator in the solution may be either higher or lower than indicated in the specific examples.

In order that, as claimed in the present invention, the solidification in the water dispersion of the sulphur compound of the fatty oil takes place without external heating, it is essential that the reaction be so far advanced that the time for solidification when treated with solutions of accelerators is within certain limits.

Experiment will determine to what degree of reaction the compound should be brought, and the stage of the process can be measured with the solidification test. If the solidification time is known, the same product can always be reproduced.

It may be mentioned that the temperature of the solution employed in making the solidification test may be different in different circumstances. With many esters which are normally liquid at room temperature, the test solution may likewise be at room temperature. On the other hand, in cases where the material being treated is normally more or less solid at room temperature, but is liquid, for example, somewhere between about room temperature and 100° C., the test solution may be employed at a higher temperature, a practical range of temperature for the test solution being from about room temperature up to the boiling point of the test solution.

After the reaction has advanced to the required degree, the product can easily be dispersed in water without any difficulty in the manner in which liquids or pastes are dispersed, for example, after emulsifying agents are added and the compound mixed with the required quantity of water in any suitable equipment, such as a high speed stirrer or a kneading machine according to the consistency of the material, and thereafter allowed to pass through an emulsifying equipment, such as a "Premier" mill or a "Hurrell" homogenizer.

In such an emulsion the properties of the dispersed fatty oil compound will remain unchanged for a short time. When stored for a somewhat longer period than a few days solidification will take place although no heating is applied and no chemicals which may react with the sulphur fatty oil compound are added.

The dispersion obtained according to the present invention has the advantage that apart from the small quantity of emulsifying agents no additional substances are necessarily present. An emulsion with a pH value near the neutral can be obtained if desired.

Solidification accelerators may, of course, be present since it is of advantage to use such accelerators in the emulsions.

Immediately or soon after dispersing in water by known methods, the sulphur fatty oil compound prepared according to my invention may be passed several times through a homogenizer of known type, thereby reducing the particle size. Preferably any solidification accelerator used should be added after the desired particle size is obtained. When the dispersion is kept for some time at room temperature (for instance, 3 to 20 days depending upon the presence or absence, and quantity of accelerator used), the disperse phase has solidified and after evaporation of the water at room or low temperature or by coagulation a solid residue can be obtained. This residue may be dry or slightly sticky, which stickiness may soon disappear on standing in contact with the air.

Because no heating is required to transform the dispersed phase into a solid product, there is no danger that the dispersion will become coarser and the quantity of emulsifying agent and protective colloid can be kept much lower than in the case where heating is required for solidification of the sulphur fatty oil compound. All emulsifying agents which are effective only at low temperature can also be used. Since the quantities of additional substances for emulsification and stabilization of the dispersion can be kept low, the properties of the product made from the dispersion will display good water resistance and other desirable properties.

Metallic salts, known as dryers, as zinc, manganese, cobalt and lead salts can be added to the fatty oil compound preferably prior to dispersion, which will influence the properties of the film or other product obtained after evaporation of the water, when allowed to dry in the air.

In carrying out my invention the unsaturated fatty oil must be brought to the advanced stage of reaction. This is done by first heating the unsaturated fatty oil and sulphur under continuous stirring to about 120–200° C., usually below 180° C., the heating being continued as long as the sulphur seems to combine with the oil and no sulphur separates out on cooling. The minimum amount of sulphur necessary in this process will depend on the oil and its previous treatment. In general, five per cent was found to be the lowest amount with which the effect claimed by me can be obtained, at least with most of the esters. However, with specially treated oils, such as heavy heat-bodied oils, or oils containing resins capable of increasing the degree of heat bodying (for instance, rosin modified maleic type alkyd resins), smaller amounts of sulphur may be sufficient.

The upper limit for sulphur is established by that quantity which will combine with the oil or other material being treated, the percentage usually and preferably being below about 40%. After the sulphur is brought in a combined state with the oil, it is advisable to reduce the temperature usually below 150° C., in order to reduce the rate of the reaction and continue the heating so long as the oil will solidify within a limited time in the manner previously described. When the sulphur fatty oil compound is brought to the required stage of the reaction, the heating is interrupted and the oil can be emulsified in water.

It is important that the reaction be terminated at the point where the material is still liquid, semi-liquid or pasty below about 100° C., but capable of rapid solidification, for instance, at a rate determined in accordance with the test given above. Otherwise, solid, infusible products will be produced, similar to known factices, which ordinarily are not suitable for emulsification in the manner described herein.

It should be noted that the presence of excess free sulphur will not impair the product, although for many purposes it may be undesirable.

As accelerating reagents for solidification, concentrated solutions of all substances which catalyze the solidification can be used such as organic amino compounds (isopropylamine, ethylenediamine, etc.), or a 27–30% solution of ammonia gas in water, soluble salts of dithiocarbamic acids, etc. Morpholine may also be used, or other compounds of that type. The more advanced the stage of the reaction and the higher the concentration of solidification accelerators, the quicker will be the solidification. However, it must be understood that no solidification will take place if the reaction is not sufficiently advanced.

The product manufactured according to my invention will solidify gradually in a dispersion on standing. The change into a solid state can be greatly accelerated without heating by the addition of accelerators, i. e., catalysts of solidification; as mentioned above. So for example, the addition of a solution of ammonia to the dispersion, in a quantity such that the final concentration of ammonia in the dispersion will be ½%, will accelerate the solidification to such an extent that one day after the addition of ammonia, appreciable solidification can be observed. This would require about 20 days without the accelerator addition.

Since the solidification begins immediately after the addition of the catalyst, it is advisable to make this addition only after the process of emulsification is completed.

A great variety of products can be manufactured in this manner by controlling the stage of the reaction before emulsification, which can be easily reproduced by using the solidification test, already described. The more advanced the stage of the reaction, the less time required in the emulsified state to produce a solid material. These sulphur-fatty oil compounds can be kept liquid at room temperature or at slightly elevated temperature for considerable time and can be used for dispersion several days after they have been prepared. The time for keeping the reaction product in an unchanged state can be greatly prolonged by the addition of solvents such as benzene, toluene, hexane, etc., to the compound. The presence of these solvents in the dispersion will also retard the rate of solidification of the dispersed fatty oil product. The presence of solvents in the dispersion is of advantage when such a solidification must be prevented, as in the case of the making of adhesives.

The water dispersion of this fatty oil sulphur compound can be positively or negatively charged according to the emulsifying agent and protective colloids or stabilizers present.

A great number of substances in a similar dispersed state can be mixed with the dispersion produced according to my invention and products of great variety can be obtained. Such dispersions are those of artificial or natural rubber, synthetic rubber-like substances, artificial or natural resins. Furthermore, dispersions of derivatives of natural substances such as rubber derivatives may be used in admixture. The products separated from such admixtures may be elastic, such as those obtained from dispersions made with rubber-like substances; or they may be hard, as when made with artificial or natural resins, rubber derivatives, etc. Furthermore, it is possible to produce a wide variety of products by mixing several of the dispersions together, such as rubber latex and resin dispersions with the dispersion of the fatty oil compound, prepared according to the present invention. Such mixes will give excellent adhesives.

It is also possible to dissolve or mix in the fatty oil compound before it is dispersed a great number of substances which are compatible with the compound. Such compatible substances are, for instance, natural and artificial resins, ethyl cellulose, rubber, chlorinated rubber, asphalts, etc.

One useful application is to mix the reaction product before emulsification with crude rubber or reclaimed rubber and disperse the resultant highly plasticized mixture in water and solidify the fatty oil sulphur reaction products as described previously.

Although useful products are obtained when using esters of unsaturated fatty acids generally, it is noted that products having especially desirable properties, are secured when using esters of fatty acids having more than one double bond in the fatty acid chain or when using esters of hydroxylated fatty acids. The latter two groups, either in untreated form, or in various treated forms, such as blown, heat bodied or otherwise treated, yield products having particularly good characteristics, such as hardness, infusibility, and in the case of hydroxylated fatty acid esters or blown or heat bodied esters in general, light colored products are obtained.

I have further found that some of the most useful products are secured when using esters of ricinoleic acid, of linoleic and linolenic acids and of those acids having conjugated double bonds.

Combinations of various esters may be used.

From the above discussion and also from other examples given herebelow, it will be seen that the process is applicable to fatty acid esters treated either alone or in combination with or in the presence of other materials which may or may not react with sulphur. In fact, the essentials of the process involve a reaction with the fatty acid ester, so that wherever the ester is present, the process is applicable, so long as the physical and chemical state or "environment" is not such as to prevent the reaction from taking place.

With regard to the esters, it is to be noted that not only the glycerin esters, such as fatty oils, are usable as starting materials, but also fatty acid esters with other polyhydric alcohols, such as glycols, pentaerythritol, sorbitol and mannitol. Esters with trihydric, tetrahydric and hexahydric alcohols are particularly useful.

Also alkyd resins of the types containing fatty acids and polyhydric alcohols may be treated according to my process. Further, oleo-resinous varnish bases, such as fatty oil-plus-varnish resin blends, may be treated.

It is to be noted that products of various different characteristics may be secured depending upon the rate of addition of sulphur and control of temperature and variations thereof.

My invention is illustrated but not limited by the following examples.

*Example 1*

1000 grams of raw linseed oil sulphur compound was prepared by heating the oil with 15% by weight of sulphur at 150° C. for two hours, after which time the sulphur entered into the fatty oil molecule and no sulphur crystallized out on cooling. The product obtained was soluble in acetone and also in benzene. The heating was continued for sixty minutes at 130° C. after which the acetone solubility of the product was appreciably reduced. The product was liquid and soluble in benzene. A sample of this product in contact with a 25% ammonia solution in water for sixty minutes did not show solidification. The heating was continued and from time to time the solidification test was carried out. After three hours heating at 130° C. the time for solidification observed was found to be one minute. In this state the heating was interrupted and the reaction product was allowed to cool down. The reaction product was liquid and had a honey-like consistency.

This reaction product was used for making a water dispersion. It was mixed with 15 grams emulsifying agent known in the art as Emulphor AG (probably a polyethylenoxide condensation product with stearic alcohol). 400 grams of water, the surface tension of which was reduced by the addition of a detergent (0.1% "Aquarex" of the E. I. du Pont de Nemours Company, Wilmington, Delaware), was mixed with the reaction product. This mixture was allowed to pass through an emulifying equipment, i. e., a Hurrell homogenizer. A fine dispersion with a particle size of 2-4 microns resulted. The disperse phase remained fluid and apparently unchanged for the first seven days after dispersion, after which time gradual solidification could be observed on samples obtained on drying at 25° C. on a glass plate.

When a concentrated solution of ammonia was added to the dispersion immediately after emulsification, the amount of which was such, that the final concentration was adjusted to be 0.5% on the total weight of the dispersion, solidification of the disperse phase in the dispersion could be observed thirty minutes after the addition of ammonia. When the disperse phase was examined after three weeks of storage, it was found to be dry and solid and only one third was soluble in benzene. On heating to 120° C. or higher, the product did not liquefy and after sixty minutes heating at 130° C., it was transformed into a hard infusible film.

The dispersion could be used with other water soluble products or products dispersed in water.

Example 2

1000 gms. of refined castor oil was heated to 160° C. and at this temperature 100 gms. of sulphur were added. The sulphur combined with the oil within two hours. The heating was continued for three more hours at 150° C. after which the product solidified when it was subjected to the solidification test with concentrated ammonium solution. The time of solidification in the test was about two minutes. The time of solidification in a test using a 50% aqueous solution of morpholine was four minutes.

The process of dispersing was carried out in the same manner as in Example 1.

The dispersed material when separated from the emulsion was different from the linseed oil product. It had a light yellowish color and it showed some elasticity and strong surface adhesion. Furthermore, the product was soluble in acetone, but only partially soluble in hydrocarbon solvents.

Example 3

A heat bodied oil made of 700 parts of linseed oil, 300 parts of a hydrogenated rosin ester ("Staybelite" No. 10 of the Hercules Powder Company) was used, 1000 grams of which was heated to 170° C. at which temperature 50 parts of sulphur were added. After one hour's heating, the temperature was adjusted to 150° C. and an additional 100 parts of sulphur was added and the mix was kept at this temperature under continuous stirring until the product showed solidification with an ammonia solution in two minutes' time. The heating was interrupted and the liquid viscous mass was emulsified in water in the manner above indicated.

The product obtained from the emulsion after one week storage showed improved film strength and elasticity compared with the product in Example 1.

Example 4

250 grams of an alkyd resin was made by heating 1000 parts of linseed oil fatty acids, 1560 parts of phthalic anhydride and 672 parts of soya bean fatty acids and 912 parts of glycerin in a closed kettle under $CO_2$ at 245° C. for 2½ hours until an acid number of 15 was obtained. This material and 250 grams of alkali refined linseed oil were heated together to 150° C. until a homogeneous material was obtained.

56.2 grams of sulphur were added, and the heating was continued at 150° C. for 30 minutes, after which the temperature was reduced to 130° C. and the heating was continued for one hour until the reaction product showed solidification in concentrated ammonia within 2 minutes. The consistency of this material was pasty at room temperature and very viscous at 100° C. For dispersing, the water was kneaded into the material, containing emulsifying agents, and after an oil in water dispersion was obtained, it was allowed to pass through a homogenizer to reduce the particle size. Morpholine was added in such a quantity that the final concentration in the dispersion was 1%.

A film obtained after 24 hours, was more elastic, extensible and had better resistance to abrasion than a film made with the product of Example 1.

I claim:

1. In the production of vulcanized esters of unsaturated fatty acids, the method which comprises vulcanizing an ester selected from the class consisting of esters of fatty acids having more than one double bond in the fatty acid chain, and esters of hydroxylated fatty acids, the vulcanization being effected with sulphur at a temperature between about 120° C. and about 200° C., and the vulcanization at said temperature being continued until that stage of the reaction is reached at which a drop of the heated mixture, when placed in a 25% aqueous ammonia solution, will display appreciable solidification within about 5 minutes, at which stage of the reaction the vulcanized material has the capability of undergoing spontaneous solidification in an aqueous dispersion at room temperature but the heating being terminated prior to reaching the stage of an infusible gel structure at the treatment temperature, and forming an aqueous dispersion of the material prior to appreciable solidification beyond that point at which the heating was terminated, whereby appreciable spontaneous solidification of the material takes place in the dispersion.

2. A method in accordance with claim 1 in which the dispersion further contains an aggregating agent selected from the class consisting of aliphatic and aromatic water soluble bases.

3. A method in accordance with claim 1 in which the dispersion further contains ammonia.

4. A method in accordance with claim 1 in which the ester is an ester of ricinoleic acid.

5. A method in accordance with claim 1 in which the ester is an ester of a fatty acid having more than one double bond in isolated positions.

6. A method in accordance with claim 1 in which the ester is selected from the class consisting of esters of linoleic acid and linolenic acid.

7. A method in accordance with claim 1 in which the ester is an ester of a fatty acid having conjugated double bonds.

8. The method in accordance with claim 1 in which the ester being treated is a fatty acid ester with a trihydric alcohol.

9. The method in accordance with claim 1 in which the ester being treated is a fatty acid ester with glycerin.

10. The method in accordance with claim 1 in which the ester being treated is a fatty acid ester with a tetrahydric alcohol.

11. The method in accordance with claim 1 in which the ester being treated is a fatty acid ester with pentaerythritol.

12. The method in accordance with claim 1 in which the ester being treated is a fatty acid ester of a hexahydric alcohol.

13. The method in accordance with claim 1 in which the ester being treated is a fatty acid ester of sorbitol.

14. In the production of vulcanized esters of unsaturated fatty acids, the method which comprises vulcanizing the ester with sulphur at a temperature between about 120° C. and about 200° C., the vulcanization at said temperature being continued until that stage of reaction is reached at which a drop of the heated mixture, when placed in a 25% aqueous ammonia solution, will display appreciable solidification within about 5 minutes, at which stage of the reaction the vulcanized material has the capability of undergoing spontaneous solidification in an aqueous dispersion at room temperature but the heating being terminated prior to reaching the stage of an infusible gel structure at the treatment temperature, and forming an aqueous dispersion of the material prior to appreciable solidification beyond that point at which the heating was terminated, whereby appreciable spontaneous solidification of the material takes place in the dispersion.

15. A method in accordance with claim 14 in which the ester is a heat bodied fatty acid ester.

16. A method in accordance with claim 14 in which the ester being treated is a fatty acid ester with a polyhydric alcohol incorporated in an alkyd resin.

17. A method in accordance with claim 14 in which the ester being treated is a fatty acid ester with a polyhydric alcohol incorporated in an oleoresinous blend.

18. A method in accordance with claim 14 in which an agent promoting or accelerating solidification is added to the dispersion after formation thereof.

PAUL STAMBERGER.

REFERENCES CITED

The following references are of record in the file of this patent:

UNITED STATES PATENTS

| Number | Name | Date |
|---|---|---|
| 2,172,955 | Colbeth | Sept. 12, 1939 |
| 2,083,549 | Auer | June 15, 1937 |
| 2,335,998 | Colbeth | Dec. 7, 1943 |
| 2,234,545 | Auer | Mar. 11 1941 |